(12) United States Patent
Lin et al.

(10) Patent No.: US 12,423,521 B2
(45) Date of Patent: Sep. 23, 2025

(54) USING UNSUPERVISED CLUSTERING AND LANGUAGE MODEL TO NORMALIZE ATTRIBUTE TUPLES OF ITEMS IN A DATABASE

(71) Applicant: Maplebear Inc., San Francisco, CA (US)

(72) Inventors: Shih-Ting Lin, Santa Clara, CA (US); Prithvishankar Srinivasan, Seattle, WA (US); Saurav Manchanda, Seattle, WA (US); Shishir Kumar Prasad, Fremont, CA (US); Min Xie, Santa Clara, CA (US)

(73) Assignee: Maplebear Inc., San Francisco, CA (US)

( * ) Notice: Subject to any disclaimer, the term of this patent is extended or adjusted under 35 U.S.C. 154(b) by 188 days.

(21) Appl. No.: 18/215,505

(22) Filed: Jun. 28, 2023

(65) Prior Publication Data
US 2025/0005279 A1    Jan. 2, 2025

(51) Int. Cl.
*G06F 40/247* (2020.01)
*G06F 16/21* (2019.01)
*G06F 16/215* (2019.01)
*G06F 16/28* (2019.01)

(52) U.S. Cl.
CPC .......... *G06F 40/247* (2020.01); *G06F 16/211* (2019.01); *G06F 16/215* (2019.01); *G06F 16/285* (2019.01)

(58) Field of Classification Search
None
See application file for complete search history.

(56) References Cited

U.S. PATENT DOCUMENTS

| | | | | |
|---|---|---|---|---|
| 2023/0237277 A1* | 7/2023 | Reza | ...................... | G06F 40/186 704/9 |
| 2023/0252224 A1* | 8/2023 | Tran | ........................ | G06F 40/56 715/256 |
| 2024/0354375 A1* | 10/2024 | Horev | ................... | G06F 18/231 |

* cited by examiner

Primary Examiner — Quynh H Nguyen
(74) Attorney, Agent, or Firm — Fenwick & West LLP (57) ABSTRACT

A computer system uses clustering and a large language model (LLM) to normalize attribute tuples for items stored in a database of an online system. The online system collects attribute tuples, each attribute tuple comprising an attribute type and an attribute value for an item. The online system initially clusters the attribute tuples into a first plurality of clusters. The online system generates prompts for input into the LLM, each prompt including a subset of attribute tuples grouped into a respective cluster of the first plurality. Based on the prompts, the LLM generates a second plurality of clusters, each cluster including one or more attribute tuples that have a common attribute type and a common attribute value. The online system maps each attribute tuple to a respective normalized attribute tuple associated with each cluster. The online system rewrites each attribute tuple in the database to a corresponding normalized attribute tuple.

20 Claims, 5 Drawing Sheets

USING UNSUPERVISED CLUSTERING AND LANGUAGE MODEL TO NORMALIZE ATTRIBUTE TUPLES OF ITEMS IN A DATABASE

BACKGROUND

Online systems, such as online concierge systems, typically receive item attributes (i.e., product attributes) from multiple sources, such as third parties catalog data, user queries, machine-learning models, etc. Each attribute for a corresponding item (i.e., product) can be commonly expressed as a tuple of an attribute type and an attribute value. Multiple attributes can be expressed as different attribute tuples (e.g., using different attribute types and/or attribute values) although these attributes are essentially equivalent, i.e., they are associated with the same items. For example, a first attribute tuple "nutrition_fact: non-fat" extracted from a description of a first item using a machine-learning model is different from a second attribute tuple "fat content: zero fat" extracted from a name of a second item, although the first and second attribute tuples are related to the same items (i.e., same products). It is therefore desirable to normalize different attribute tuples in order to deduplicate item attributes and otherwise compare items with similar attributes. This normalization post-processing commonly occurs within attribute extraction pipelines, and it is typically performed by time-consuming human curation that is prone to errors. Conventionally, there are no technical solutions to automatically perform attribute normalization for large data sets (i.e., large number of items) at online concierge systems. It is infeasible to perform the attribute normalization manually at a scale required by an online concierge system having many items and their attributes, i.e., manual processes are not feasible for large data sets.

SUMMARY

Embodiments of the present disclosure are directed to utilizing an unsupervised clustering algorithm and a language model to automatically normalize attribute tuples of items in a database of an online concierge system. The normalized attribute tuples are stored at the database and utilized for various downstream applications of the online concierge system (e.g., user's search of the database based on a textual query, comparing attributes of products from different vendors, etc.).

In accordance with one or more aspects of the disclosure, an online concierge system obtains a plurality of attribute tuples stored in a database, each of the plurality of attribute tuples comprising an attribute type and an attribute value for a corresponding item of a plurality of items. The online concierge system applies a clustering algorithm to the plurality of attribute tuples to group the plurality of attribute tuples into a first plurality of clusters. The online concierge system generates a plurality of prompts for input into a large language model (LLM), each of the plurality of prompts generated to include a subset of the plurality of attribute tuples grouped into a respective cluster of the first plurality of clusters. The online concierge system requests the LLM to generate, based on each of the plurality of prompts input into the LLM, one or more clusters of a second plurality of clusters, each cluster of the second plurality of clusters including one or more attribute tuples of the plurality of attribute tuples that have a common attribute type and a common attribute value. The online concierge system generates, for each cluster of the second plurality of clusters, a respective normalized attribute tuple of a plurality of normalized attribute tuples, the respective normalized attribute tuple comprising a normalized attribute type and a normalized attribute value that are based on the common attribute type and the common attribute value. The online concierge system maps each of the one or more attribute tuples that belongs to each cluster of the second plurality of clusters to the respective normalized attribute tuple. The online concierge system rewrites each of the plurality of attribute tuples in the database to a corresponding normalized attribute tuple of the plurality of normalized attribute tuples to generate a respective rewritten attribute tuple of a plurality of rewritten attribute tuples.

DETAILED DESCRIPTION

Figure 1A:
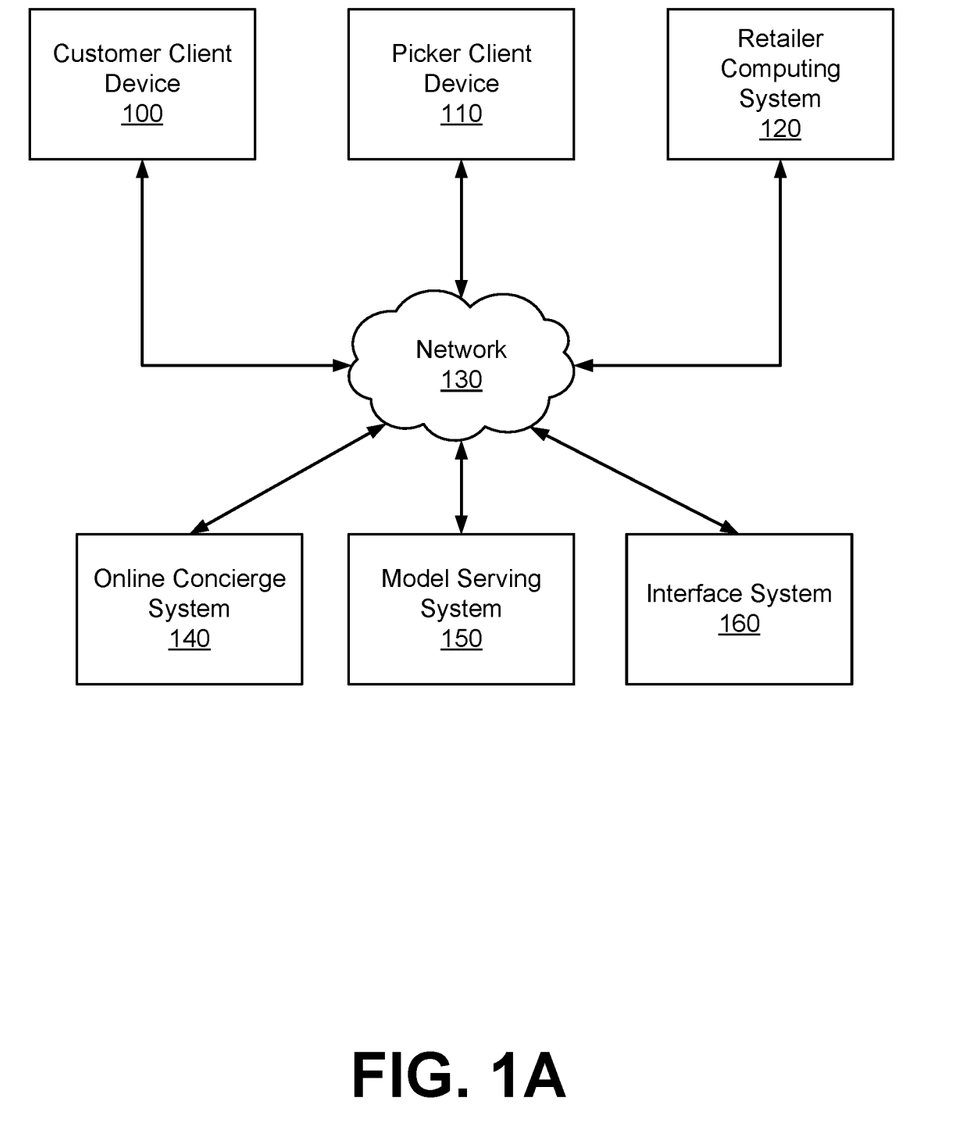
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1A, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

In accordance with one or more embodiments, the online concierge system 140 maintains a database of items and item attributes, where each attribute can be expressed as an attribute tuple that comprises an attribute type and an attribute value, i.e., attribute tuple=(attribute_type, attribute_value). As the online concierge system 140 receives attribute tuples for items from different sources (e.g., reported by various third-party retailers, extracted using various machine-learning models, extracted from textual queries provided by customers, etc.), the online concierge system 140 may have different attribute tuples that represent the same attributes. The online concierge system 140 maps those attribute tuples with the same meaning into a consistent (i.e., "normalized") naming. For example, a first attribute tuple "nutrition_fact: non-fat" extracted from a description of a first item (using, e.g., a machine-learning model) is different from a second attribute tuple "fat content: zero fat" (extracted from, e.g., a name of a second item), although the first and second attribute tuples have the same attributes. An attribute type of the first attribute tuple (i.e., "nutrition_fact") has the same meaning as an attribute type of the second attribute tuple (i.e., "fat content"); and an attribute value of the first attribute tuple (i.e., "non-fat") has the same meaning as an attribute value of the second attribute tuple (i.e., "zero fat"). Thus, it is desirable that the online concierge system 140 normalizes the first and second attribute tuples into a single common attribute tuple with a canonicalized attribute type and canonicalized attribute value. The algorithm presented herein solves the problem of attribute normalization, which is an important task in an e-commerce attribute extraction pipeline with multiple data sources. The approach presented herein can facilitate merging attribute data from different sources and can also facilitate downstream applications to identify which set of items have the same attributes.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

To identify different attribute tuples that have the same meaning, the online concierge system 140 clusters attribute tuples obtained from different sources using a two-step process. At the first step, the online concierge system 140 applies an unsupervised clustering algorithm (e.g., k-nearest neighbors algorithm by embeddings and rule-based similarity) to group attribute tuples based on their mutual similarities (i.e., similar, but not necessarily the same attribute tuples) into a same cluster of a plurality of clusters. Then, at the second step, the online concierge system 140 uses a LLM to refine initial clustering from the first step and group attribute tuples from each cluster that represent same attributes into sub-clusters. Each sub-cluster would comprise a set of attribute tuples having the same meaning. Hence, the LLM is utilized herein to refine each initial cluster and find different attribute tuples with an identical meaning that are placed into a corresponding sub-cluster. For each sub-cluster formed by the LLM, the online concierge system 140 then normalizes the set of attribute tuples that are determined to represent the same attribute by mapping the set of attribute tuples to a common representative attribute tuple, i.e., to a normalized tuple (normalized_attribute_type, normalized_attribute_value). These matched attribute tuples can then be deduplicated in the database of the online concierge system 140 and used to better compare items by their attributes.

The online concierge system 140 prepares a prompt for input to the LLM of the model serving system 150. The prompt represents a textual input to the LLM. At least a portion of the prompt is generated by the online concierge system 140 applying the unsupervised clustering algorithm. Hence, the prompt includes sets of attribute tuples, where each set of attribute tuples represents a set of similar attribute tuples that were grouped into a corresponding cluster via the unsupervised clustering. Additionally, the prompt may include contextual information about one or more attribute tuples from each set of attribute tuples, i.e., information about an item with which an attribute tuple is associated.

An example prompt for input to the LLM may include the following textual input:

You are given a list of (attribute type, attribute value) tuples extracted by a ML model for different products from their product description. There are some tuples in the list that actually refer to the exact same product attribute. Please group the tuples that refer to the same product attribute into the same cluster.

Example attribute tuples that belong to the same cluster obtained via the unsupervised clustering that can be included in the prompt for input to the LLM are:

Fat Content: Fat Free
Dairy Free: True
Nutrition Fact: Non-Fat
Nutrition Fact: 2% Fat
Fat Content: Zero Fat
Milk Fat: 0%

Note that there can be one LLM based clustering per initial cluster formed via the unsupervised clustering algorithm. The attribute tuples within each initial cluster are input under "input attribute tuples" in a prompt template. The prompt may also include one or more requests for the LLM to generate the clustering result in a structured format (e.g., JavaScript Object Notation format).

The online concierge system 140 receives a response to the prompt from the model serving system 150 based on execution of the machine-learned model using the prompt. The response includes a semi-structured result that includes sub-clusters the LLM thinks the initial cluster should be further split into so that attribute tuples with the same meaning are correctly grouped together into each sub-cluster.

The example response to the above prompt can be as follows.

Cluster 1: Fat Content
Fat Content: Fat Free
Nutrition Fact: Non-Fat
Fat Content: Zero Fat
Milk Fat: 0%
Cluster 2: Dairy Free
Dairy Free: True
Cluster 3: Nutrition Fact
Nutrition Fact: 2% Fat Hence, the LLM separates attribute tuples from the initial cluster (that were provided as part of the prompt to the LLM) into three separate sub-clusters (e.g., Cluster 1, Cluster 2 and Cluster 3 in the example response above), where attribute tuples with the same meaning are grouped together into each sub-cluster.

The online concierge system 140 imports the response from the model serving system 150. As the response may include the semi-structured list of sub-clusters with attribute tuples, the online concierge system 140 may apply a rule-based post processing to generate structured clustering results. Alternatively or additionally, a human curation may be employed to further refine clustering results output by the LLM. Once the clustering output produced by the LLM is refined, the online concierge system 140 selects one attribute tuple from each cluster as a normalized attribute tuple and creates a mapping from the original attribute tuples to normalized attribute tuples. In such a manner, the online concierge system 140 maps attributes for all items collected from different sources into normalized attributes.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
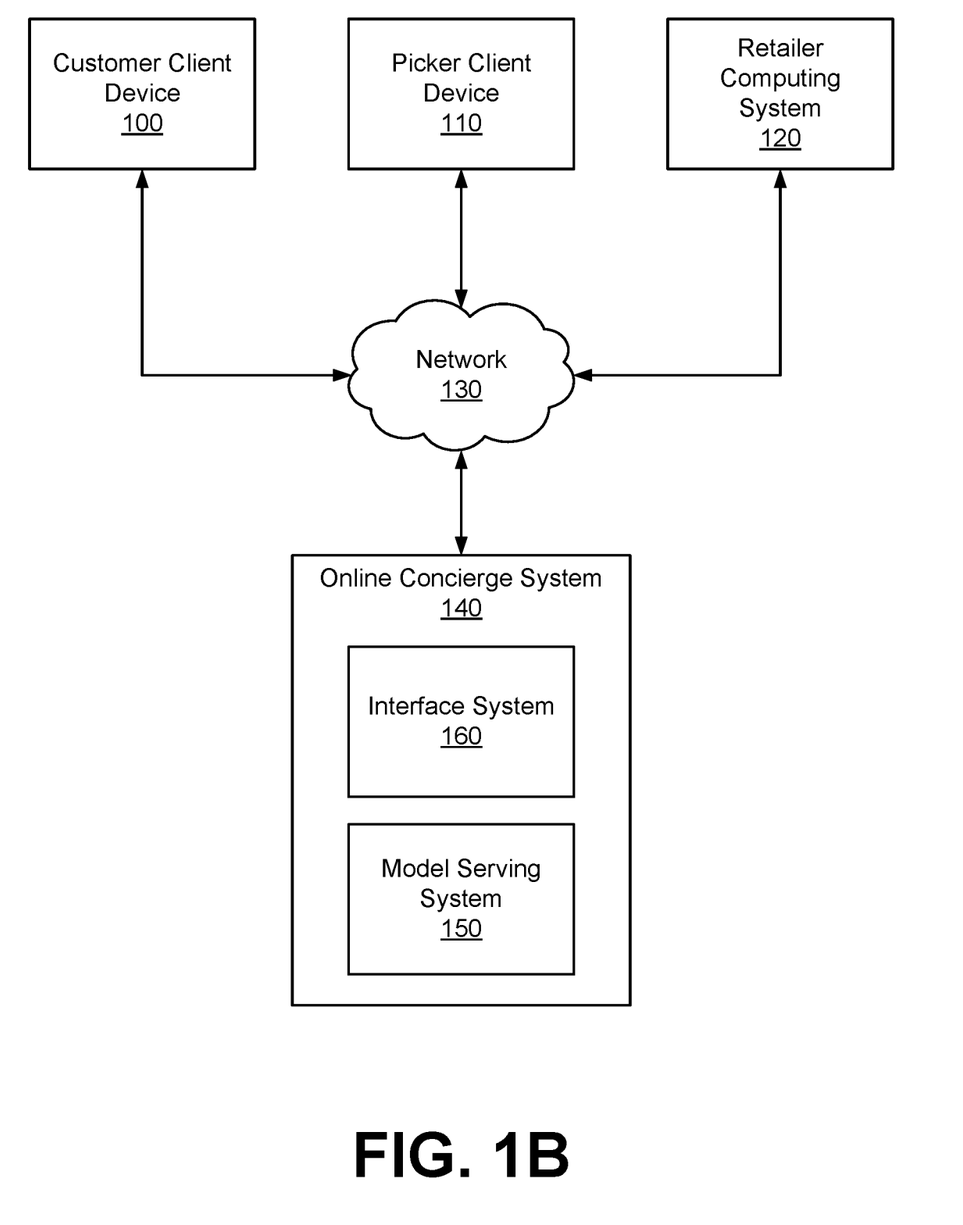
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140.

Figure 2:
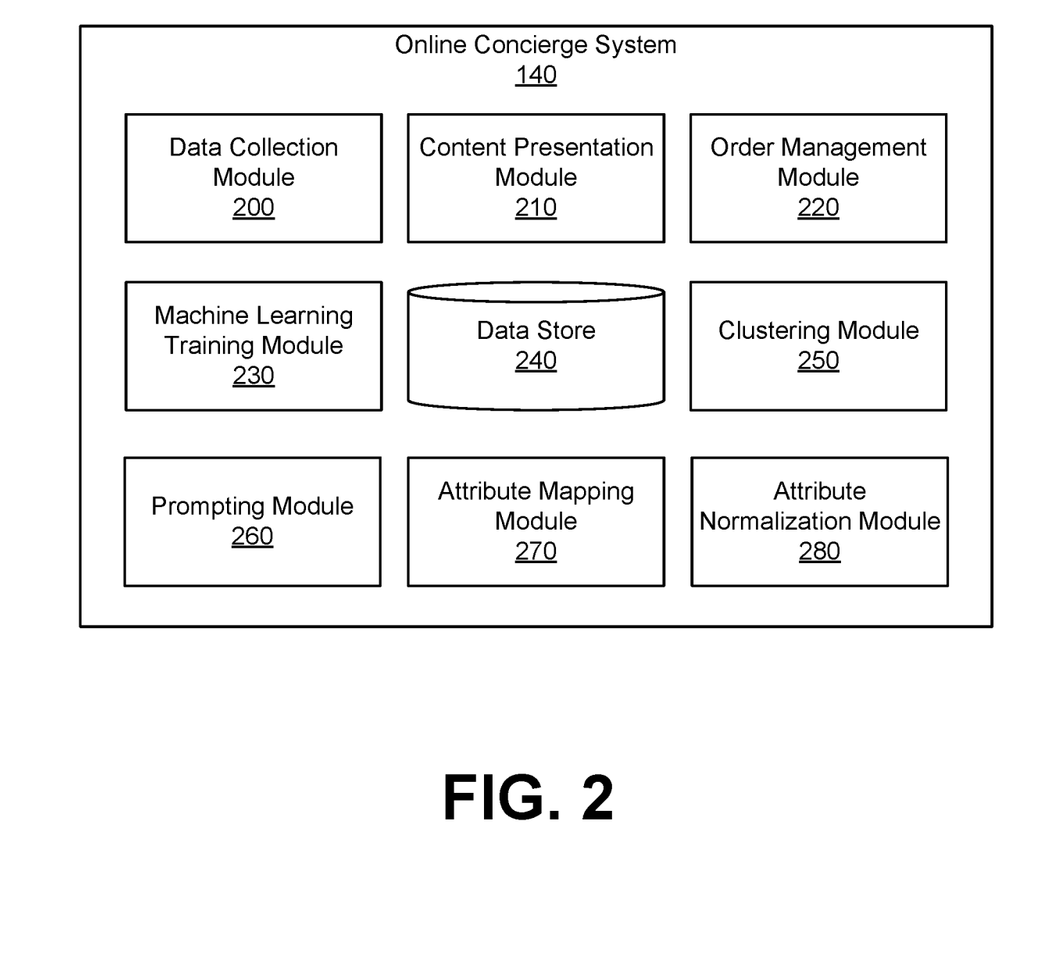
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, a clustering module 250, a prompting module 260, an attribute mapping module 270, and an attribute normalization module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. For example, the machine-learning training module 230 may train the item selection model, the availability model, or any of the machine-learned models deployed by the model serving system 150. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140. In one or more other embodiments, when the model serving system 150 is included in the online concierge system 140, the machine-learning training module 230 may further train parameters of the machine-learned model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

The data store 240 may store attribute tuples each in the form of (attribute type, attribute value) that were obtained from different sources, such as extracted from various machine-learning models, obtained from data catalogs of different third-party vendors (e.g., retailers), extracted from customer queries, etc. In particular, the data store 240 may store attribute tuples extracted by one or more LLMs from product descriptions, attribute tuples extracted by different machine-learning models applied on different product inputs (e.g., attribute tuples extracted from product inputs such as product names, product warnings, product images, etc.), attribute tuples that include structured attribute data provided from retailers, etc. The online concierge system 140 applies a two-step clustering to group the attribute tuples stored at the data store 240 that have the same meaning.

The clustering module 250 performs the first step of the two-step clustering by applying an unsupervised clustering on the attribute tuples stored at the data store 240 in order to perform initial (i.e., rough) clustering of the stored attribute tuples. The clustering module 250 may first compute a similarity score for each pair of the attribute tuples to identity if the attribute tuples from each pair have similar meanings. The clustering module 250 may use, e.g., the template "For this item, the value of the "{ATTRIBUTE_TYPE}" attribute is: {ATTRIBUTE_VALUE}" to obtain an embedding for an attribute tuple and compute an embedding-based similarity score for each pair of the attribute tuples. Alternatively, the clustering module 250 may employ a rule-based similarity algorithm such as the exact matching algorithm to determine whether two attribute values in a pair of attribute tuples have overlapped synonyms (e.g., as set in WordNet).

Based on the determined pairwise similarity scores, the clustering module 250 applies a clustering model to group attribute tuples with the pairwise similarity scores higher than a threshold score together in order to form initial clusters of attribute tuples. Note that the clustering module 250 may set a relatively low threshold score to capture the pairs of attribute tuples with very different attribute types and/or attribute values that actually have the same meaning. However, with the threshold score set to be relatively low, some pairs of attribute tuples would be grouped into initial clusters but those pairs of attribute tuples actually have attribute types and/or attribute values with different meanings. In one or more embodiments, the clustering module 250 may apply some other unsupervised clustering algorithm, such as the k-means clustering algorithm based on attribute tuple embeddings. The clustering module 250 may stop the unsupervised clustering algorithm before the clustering module 250 starts separating attribute tuples with the same meaning into different clusters. In one or more embodiments, the clustering module 250 sets a stopping condition for the clustering algorithm by employing heuristics.

The online concierge system 140 utilizes a LLM (e.g., LLM of the model serving system 150) to further cluster the result of the first round of initial clustering obtained via the clustering module 250. To refine the initial clustering, the LLM may be applied on each initial cluster of attribute tuples obtained via the clustering module 250 to split each initial cluster into more precise clusters (or sub-clusters). The prompting module 260 receives initial clusters of attribute tuples from the clustering module 250. The prompting module 260 then generates a prompt for input to the LLM, where the prompt includes a list of attribute tuples from each initial cluster. The prompting module 260 asks the LLM to group the attribute tuples from each initial cluster by which attribute tuples describe the same item attribute. The prompting module 260 may supplement the prompt for input to the LLM with contextual information about each attribute tuple, such as information about an item with which that attribute tuple was associated.

Based on each prompt received from the prompting module 260, the LLM generates a corresponding response that includes a structured list of refined clusters (e.g., sub-clusters) for each initial cluster. Each refined cluster generated by the LLM includes a subset of attribute tuples that are associated with the same item attribute. The response generated by the LLM that includes a plurality of refined clusters of attribute tuples may be imported to the attribute mapping module 270.

In one or more embodiments, the machine-learning training module 230 may use the response from the LLM (i.e., higher quality clustering output) to retrain the clustering algorithm (e.g., clustering model or embedding model) applied by the clustering module 250 in order to improve the initial clustering step. For example, once the LLM generates enough high-accuracy clusters, the machine-learning training module 230 may use the response from the LLM to train an embedding model applied by the clustering module 250 specifically for attribute normalization. When the data store 240 stores previously unseen attribute tuples for new items or new data sources, the embedding model applied by the clustering module 250 can be used to assign the previously unseen attribute tuples into existing clustering with the embedding similarity score.

For each refined cluster generated by the LLM, the attribute mapping module 270 generates a normalized (or representative) attribute tuple and creates a mapping from original attribute tuples grouped into that refined cluster to the normalized attribute tuple. In one or more embodiments, the attribute mapping module 270 selects one of the original attribute tuples from the refined cluster as the normalized attribute tuple. The attribute mapping module 270 may select the most common of the original attribute tuples from the refined cluster as the normalized attribute tuple (e.g., an attribute tuple that is extracted from most items among the attribute tuples in the refined cluster). Alternatively, the attribute mapping module 270 may select (e.g., for the most efficient data usage) the shortest attribute type and the shortest attribute value among all original attribute tuples from the refined cluster as a normalized attribute type and a normalized attribute value of the normalized attribute tuple. In general, for each refined cluster of attribute tuples generated by the LLM, the attribute mapping module 270 may apply a defined metric to select one attribute tuple from that refined cluster as a normalized tuple. In one or more other embodiments, the attribute mapping module 270 requests the LLM to determine a text for a normalized attribute tuple to be associated with each refined cluster of attribute tuples.

The attribute normalization module 280 rewrites each attribute tuple stored at the data store 240 with a corresponding normalized attribute tuple. The attribute normalization module 280 applies the mapping created by the attribute mapping module 270 on the attribute tuples for each item from each data source in order to generate the consistent attribute data across items and data sources.

The order management module 220 (or some other module of the online concierge system 140) may conduct a search through the normalized attribute tuples stored at the data store 240. In one or more embodiments, the search may be conducted based on a search query from a customer of the online concierge system 140 in order to find a match between an attribute tuple extracted from the search query and a normalized attribute tuple for an item as stored at, e.g., the data store 240. The order management module 220 may obtain the search query from a user interface of the customer client device 100. The order management module 220 may then extract an attribute tuple from the search query. Alternatively, the order management module 220 may request the LLM or some other trained machine-learning model to extract an attribute tuple from the search query. The order management module 220 may then search through the normalized attribute tuples (stored at, e.g., the data store 240) to find a match between the extracted attribute tuple and a stored normalized attribute tuple. The order management module 220 may utilize this matching for ranking scores of query results. The content presentation module 210 may cause the customer client device 100 to display a user interface with the query results that include one or more lists of items for inclusion into a shopping cart.

Figure 3:
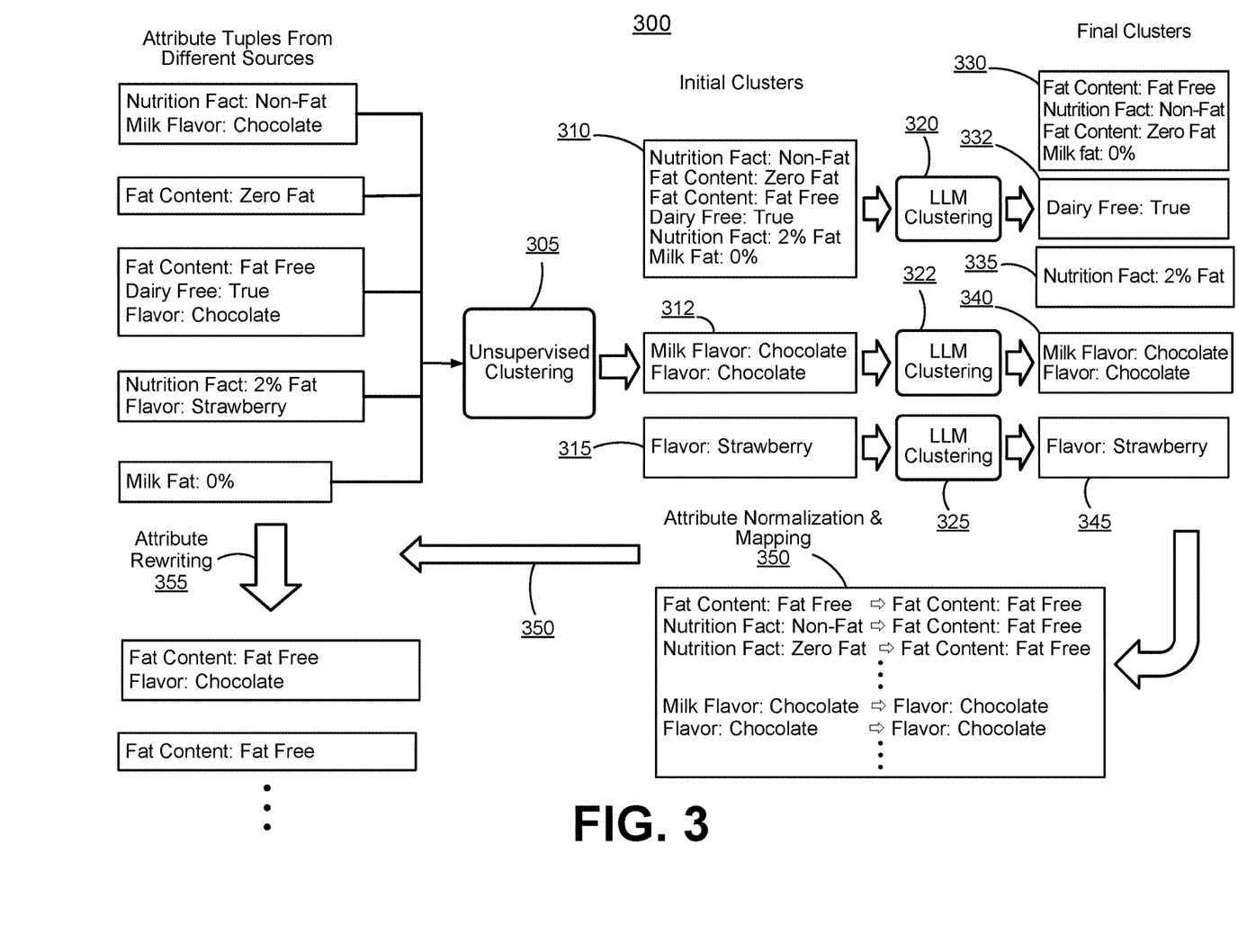
FIG. 3 illustrates an example algorithmic flow of applying an unsupervised clustering and language model to automatically normalize attribute tuples of items at an online concierge system, in accordance with one or more embodiments.

FIG. 3 illustrates an example algorithmic flow 300 of applying an unsupervised clustering and language model to automatically normalize attribute tuples of items at the online concierge system 140, in accordance with one or more embodiments. The online concierge system 140 collects attribute tuples from different sources and saves the collected attribute tuples at, e.g., the data store 240. For example, attribute tuples "Nutrition Fact: Non-Fat" and "Milk Flavor: Chocolate" for an item A are extracted by a machine-learning model; an attribute tuple "Fat Content: Zero Fat" for an item B is extracted by a machine-learning model; attribute tuples "Fat Content: Fat Free", "Dairy Free:

True" and "Flavor: Chocolate" for the item B represent third-party attribute data; attribute tuples "Nutrition Fact: 2% Fat" and "Flavor: Strawberry" for an item C are extracted by a machine-learning model; and an attribute tuple "Milk Fat: 0%" for the item B is extracted from a search query provided by a customer of the online concierge system 140.

The clustering module 250 may apply an unsupervised clustering 305 on the attribute tuples collected from different sources to generate initial clusters of attribute tuples (e.g., based on their pairwise similarity scores). For example, as illustrated in FIG. 3, an initial cluster 310 obtained via the unsupervised clustering 305 includes the following "similar" attribute tuples: "Nutrition Fact: Non-Fat", "Fat Content: Zero Fat", "Fat Content: Fat Free", "Dairy Free: True", "Nutrition Fact: 2% Fat", "Milk Fat: 0%". An initial cluster 312 obtained via the unsupervised clustering 305 includes the following "similar" attribute tuples: "Milk Flavor: Chocolate", "Flavor: Chocolate". An initial cluster 315 obtained via the unsupervised clustering 305 includes only one attribute tuple that is determined to have a different meaning from all other attribute tuples, e.g., attribute tuple "Flavor: Strawberry".

The prompting module 260 uses each initial cluster 310, 312, 315 to generate a respective prompt for a corresponding LLM clustering 320, 322, 325. The prompting module 260 requests a LLM (e.g., LLM of the model serving system 150) to perform the LLM clustering 320 based on a first prompt that includes attribute tuples from the initial cluster 310 to generate a first response that includes final clusters of attribute tuples, e.g., final clusters 330, 332 and 335. Thus, the LLM clustering 320 splits the initial cluster 310 of "similar" attribute tuples into the final clusters 330, 332 and 335, and each final cluster 330, 332, 335 includes attribute tuples that have the same meaning. For example, the final cluster 330 includes the following attribute tuples with the same meaning: "Fat Content: Fat Free", "Nutrition Fact: Non-Fat", "Fat Content: Zero Fat", "Milk Fat: 0%". The final cluster 332 includes only one attribute tuple "Dairy Free: True" that is determined to have a different meaning from the attribute tuples grouped into the final cluster 330. Similarly, the final cluster 335 includes only one attribute tuple "Nutrition Fact: 2% Fat" that is determined to have a different meaning from the attribute tuples that were placed in the final clusters 330 and 332.

The prompting module 260 further requests the LLM to perform the LLM clustering 322 based on a second prompt that includes attribute tuples from the initial cluster 312 to generate a second response that includes attribute tuples placed in a final cluster 340. Thus, the LLM clustering 322 kept both attribute tuples "Milk Flavor: Chocolate" and "Flavor Chocolate" from the initial cluster 312 in the final cluster 340 as the LLM clustering 322 determines that both attribute tuples have the same meaning, but they are also different from attribute tuples grouped into the final clusters 330, 332, 335. Similarly, the prompting module 260 further requests the LLM to perform the LLM clustering 325 based on a third prompt that includes the attribute tuple from the initial cluster 315 to generate a third response that includes at least one attribute tuple placed in a final cluster 345. In this case, the LLM clustering 325 keeps the attribute tuple "Flavor: Strawberry" in the final cluster 345 separate from other final clusters as the LLM clustering 325 determines that the attribute tuple "Flavor: Strawberry" has a different meaning than any other attribute tuple that were grouped in the final clusters 330, 332, 335, 340. Note that the LLM clustering 320, the LLM clustering 322 and the LLM clustering 325 can be performed simultaneously at a single LLM. The first, second and third responses generated by the LLM may be imported to the attribute mapping module 270.

The attribute mapping module 270 may first determine a normalized attribute tuple for each final cluster 330, 332, 335, 340 and 345. For example, the attribute mapping module 270 may select a normalized attribute tuple for the final cluster 330 based on, e.g., traffic frequencies for all attribute tuples in the final cluster 330. The attribute mapping module 270 may select the attribute tuple "Fat Content: Fat Free" as the normalized attribute tuple since this attribute tuple has the highest traffic among all attribute tuples in the final cluster 330. Similarly, the attribute mapping module 270 may select the attribute tuple "Flavor Chocolate" as a normalized attribute tuple for the final cluster 340 since this attribute tuple has the highest traffic among all attribute tuples in the final cluster 340. Once the normalized attribute tuples for all final clusters 330, 332, 335, 340, 345 are determined, the attribute mapping module 270 generates a mapping 350 from each attribute tuple in each final cluster 330, 332, 335, 340, 345 to a corresponding normalized attribute tuple selected for that final cluster 330, 332, 335, 340, 345. The attribute mapping module 270 may pass information about the mapping 350 to, e.g., the attribute normalization module 280.

The attribute normalization module 280 utilizes the mapping 350 to perform a rewriting 355 of all the collected attribute tuples stored at the data store 240 to corresponding normalized attribute tuples. For example, as shown in FIG. 3, the attribute normalization module 280 rewrites the attribute tuples "Nutrition Fact: Non-Fat" and "Milk Flavor: Chocolate" for the item A with normalized attribute tuples "Fat Content: Fat Free" and "Favor: Chocolate", respectively. Similarly, the attribute normalization module 280 rewrites the attribute tuple "Fat Content: Zero Fat" for the item B with the normalized attribute tuple "Fat Content: Fat Free". The attribute normalization module 280 may store the rewritten (i.e., normalized) attribute tuples back to the data store 240. It can be observed that different attribute tuples for items A and B "Nutrition Fact: Non-Fat" and "Fat Content: Zero Fat" are consolidated into a single normalized attribute tuple "Fat Content: Fat Free", which facilitates identification of items with same attributes.

Figure 4:
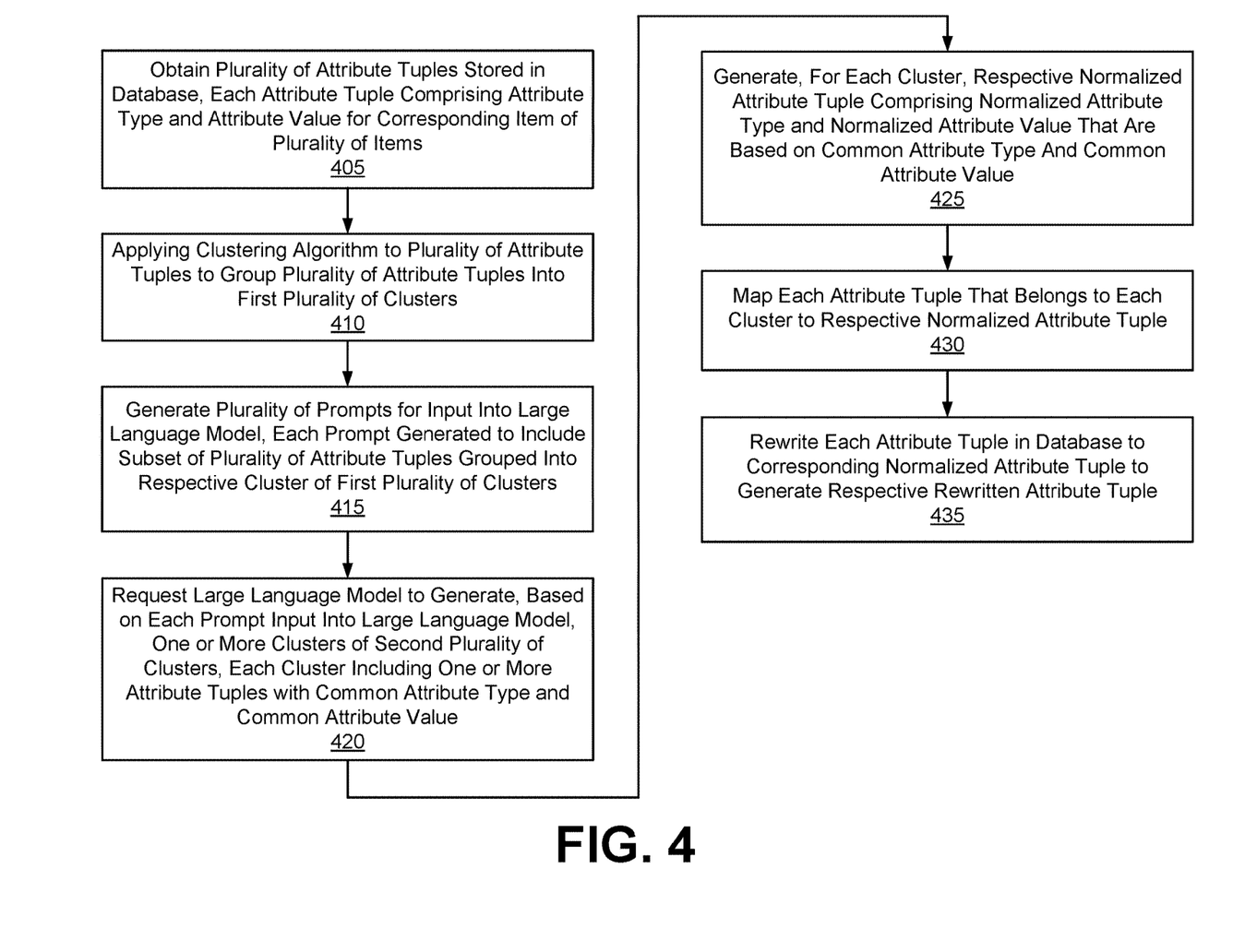
FIG. 4 is a flowchart of a method of using an unsupervised clustering and language model to automatically normalize attribute tuples of items at an online concierge system, in accordance with one or more embodiments.

FIG. 4 is a flowchart of a method of using an unsupervised clustering and language model to automatically normalize attribute tuples of items at an online concierge system, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 obtains 405 obtains a plurality of attribute tuples stored in a database (e.g., at the data store 240), each of the plurality of attribute tuples comprising an attribute type and an attribute value for a corresponding item of a plurality of items. The online concierge system 140 may collect the plurality of attribute tuples from multiple data sources.

The online concierge system 140 applies 410 (e.g., via the clustering module 250) a clustering algorithm (e.g., unsupervised clustering) to the plurality of attribute tuples to group the plurality of attribute tuples into a first plurality of clusters. The online concierge system 140 may group (e.g., via the clustering module 250) the subset of the plurality of attribute tuples into the respective cluster of the first plurality of clusters, based on a similarity score for each pair of attribute tuples in the subset being higher than a threshold score. The online concierge system 140 may group (e.g., via the clustering module 250) a first of the plurality of attribute tuples and a second of the plurality of attribute tuples into a cluster of the first plurality of clusters, based on a first attribute value of the first attribute tuple has at least one overlapped synonym with a second attribute value of the second attribute tuple. The online concierge system 140 may set (e.g., via the clustering module 250) a stopping condition for the clustering algorithm based on one or more heuristics algorithms.

The online concierge system 140 generates 415 (e.g., via the prompting module 260) a plurality of prompts for input into a LLM (e.g., the LLM of the model serving system 150), each of the plurality of prompts generated to include a subset of the plurality of attribute tuples grouped into a respective cluster of the first plurality of clusters. The online concierge system 140 may generate (e.g., via the prompting module 260) the plurality of prompts for input into the LLM by further including, in each of the plurality of prompts, contextual information about each attribute tuple from the subset of attribute tuples. The contextual information may include information about an item of the plurality of items with which each attribute tuple from the subset of attribute tuples is associated.

The online concierge system 140 requests 420 (e.g., via the prompting module 260) the LLM to generate, based on each of the plurality of prompts input into the LLM, one or more clusters of a second plurality of clusters, each cluster of the second plurality of clusters including one or more attribute tuples of the plurality of attribute tuples that have a common attribute type and a common attribute value. The online concierge system 140 may retrain (e.g., via the clustering module 250) the clustering algorithm using information about the second plurality of clusters generated by the LLM.

The online concierge system 140 generates 425 (e.g., via the attribute mapping module 270), for each cluster of the second plurality of clusters, a respective normalized attribute tuple of a plurality of normalized attribute tuples, the respective normalized attribute tuple comprising a normalized attribute type and a normalized attribute value that are based on the common attribute type and the common attribute value. The online concierge system 140 may generate (e.g., via the attribute mapping module 270) the respective normalized attribute tuple based on a most common attribute type and a most common attribute value among attribute types and attribute values of the one or more attribute tuples grouped in each cluster of the second plurality of clusters. The online concierge system 140 may generate (e.g., via the attribute mapping module 270) the respective normalized attribute tuple so that the normalized attribute type and the normalized attribute value are equal to one attribute type and one attribute value of the one or more attribute tuples grouped in each cluster of the second plurality of clusters. The online concierge system 140 may generate (e.g., via the attribute mapping module 270) the respective normalized attribute tuple based on a shortest text associated with an attribute type and an attribute value among attribute types and attribute values of the one or more attribute tuples grouped in each cluster of the second plurality of clusters. The online concierge system 140 may request the LLM (e.g., via the prompting module 260 or the attribute mapping module 270) to generate the respective normalized attribute tuple, based on attribute types and attribute values of the one or more attribute tuples grouped in each cluster of the second plurality of clusters.

The online concierge system 140 maps 430 (e.g., via the attribute mapping module 270) each of the one or more attribute tuples that belongs to each cluster of the second plurality of clusters to the respective normalized attribute tuple. The online concierge system 140 rewrites 435 (e.g., via the attribute normalization module 280) each of the plurality of attribute tuples in the database (e.g., at the data store 240) to a corresponding normalized attribute tuple of the plurality of normalized attribute tuples to generate a respective rewritten attribute tuple of a plurality of rewritten attribute tuples.

The online concierge system 140 may extract (e.g., via the order management module 220) at least one attribute tuple from a query (e.g., provided by a user of the online concierge system 140), wherein the at least one extracted attribute tuple includes at least one extracted attribute type and at least one extracted attribute value for at least one item of the plurality of items. The online concierge system 140 may match (e.g., via the order management module 220) the at least one extracted attribute tuple with at least one rewritten attribute tuple of the plurality of rewritten attribute tuples. The online concierge system 140 may rank (e.g., via the order management module 220) the at least one item in the list of items based on the matching.

The online concierge system 140 may search (e.g., via the order management module 220) through the plurality of rewritten attribute tuples stored in the database based on a query from a user of the online concierge system 140 to generate a search result comprising a list of items from the plurality of items. The online concierge system 140 may cause (e.g., via the content presentation module 210) a device of the user (e.g., the customer client device 100) to display a user interface with the list of items for inclusion into a cart.

Embodiments of the present disclosure are directed to utilizing an unsupervised clustering and a LLM to automatically normalize attribute tuples with identical attributes for items at the online concierge system 140. There are several benefits of the attribute normalization presented herein. First, the attribute normalization presented herein facilitates merging attribute data from different sources for a single item. For example, with the normalization, the online concierge system 140 can use an exact match to know that an attribute extracted by a machine-learning model and another attribute provided by a third-party source are the same and can merge them into one "normalized" attribute. Second, the attribute normalization presented herein allows downstream applications to easily identify which set of items have the same attributes. For example, once the attribute normalization is applied at the online concierge system 140, a trained recommendation model can determine that the "fat content" of first and second items are both "fat free" and recommend them to customers who prefer fat-free items. Third, the attribute normalization presented herein can also be applied to attributes extracted from search queries conducted by customers of the online concierge system 140 and facilitate matching the extracted attributes to attributes of items stored at, e.g., the data store 240. Hence, the attribute normalization presented herein facilitates the query understanding at the online concierge system 140.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a non-transitory tangible computer-readable medium:
    obtaining a plurality of attribute tuples stored in a database, each of the plurality of attribute tuples comprising an attribute type and an attribute value for a corresponding item of a plurality of items;
    applying a clustering algorithm to the plurality of attribute tuples to group the plurality of attribute tuples into a first plurality of clusters, wherein applying the clustering algorithm comprises:
        obtaining an embedding for each of the plurality of attribute tuples,
        computing, using the embedding for each of the plurality of attribute tuples, a similarity score for each pair of the plurality of attribute tuples, and
        applying a clustering model to group each pair of the plurality of attribute tuples having the similarity score above a threshold score to form the first plurality of clusters;
    generating a plurality of prompts for input into a language model, wherein each prompt of the plurality of prompts is generated to include a respective subset of attribute tuples from the plurality of attribute tuples, and wherein attribute tuples from the respective subset of attribute tuples were grouped into a respective cluster of the first plurality of clusters;
    requesting the language model to generate, based on each of the plurality of prompts input into the language model, one or more clusters of a second plurality of clusters, each cluster of the second plurality of clusters including one or more attribute tuples of the plurality of attribute tuples that have a common attribute type and a common attribute value;
    generating, for each cluster of the second plurality of clusters, a respective normalized attribute tuple of a plurality of normalized attribute tuples, the respective normalized attribute tuple comprising a normalized attribute type and a normalized attribute value that are based on the common attribute type and the common attribute value;
    mapping each of the one or more attribute tuples that belongs to each cluster of the second plurality of clusters to the respective normalized attribute tuple; and
    rewriting each of the plurality of attribute tuples in the database to a corresponding normalized attribute tuple of the plurality of normalized attribute tuples to generate a respective rewritten attribute tuple of a plurality of rewritten attribute tuples.

2. The method of claim 1, further comprising:
    grouping the respective subset of attribute tuples into the respective cluster of the first plurality of clusters, based on a similarity score for each pair of attribute tuples in the respective subset of attribute tuples being higher than a threshold score.

3. The method of claim 1, further comprising:
    grouping a first of the plurality of attribute tuples and a second of the plurality of attribute tuples into a cluster of the first plurality of clusters, based on a first attribute value of the first attribute tuple has at least one overlapped synonym with a second attribute value of the second attribute tuple.

4. The method of claim 1, further comprising:
setting, based on one or more heuristics algorithms, a stopping condition for the clustering algorithm.

5. The method of claim 1, further comprising:
generating the plurality of prompts for input into the language model by further including, in each of the plurality of prompts, contextual information about each attribute tuple from the respective subset of attribute tuples.

6. The method of claim 5, wherein the contextual information includes information about an item of the plurality of items with which each attribute tuple from the respective subset of attribute tuples is associated.

7. The method of claim 1, further comprising:
generating the respective normalized attribute tuple, based on a most common attribute type and a most common attribute value among attribute types and attribute values of the one or more attribute tuples grouped in each cluster of the second plurality of clusters.

8. The method of claim 1, further comprising:
generating the respective normalized attribute tuple so that the normalized attribute type and the normalized attribute value are equal to one attribute type and one attribute value of the one or more attribute tuples grouped in each cluster of the second plurality of clusters.

9. The method of claim 1, further comprising:
generating the respective normalized attribute tuple, based on a shortest text associated with an attribute type and an attribute value among attribute types and attribute values of the one or more attribute tuples grouped in each cluster of the second plurality of clusters.

10. The method of claim 1, further comprising:
requesting the language model to generate, based on attribute types and attribute values of the one or more attribute tuples grouped in each cluster of the second plurality of clusters, the respective normalized attribute tuple.

11. The method of claim 1, further comprising:
extracting at least one attribute tuple from a query, the at least one extracted attribute tuple including at least one extracted attribute type and at least one extracted attribute value for at least one item of the plurality of items;
matching the at least one extracted attribute tuple with at least one rewritten attribute tuple of the plurality of rewritten attribute tuples; and
ranking, based on the matching, the at least one item in a list of items from the plurality of items.

12. The method of claim 1, further comprising:
retraining the clustering algorithm using information about the second plurality of clusters generated by the language model.

13. The method of claim 1, further comprising:
searching through the plurality of rewritten attribute tuples stored in the database based on a query from a user of an online system to generate a search result comprising a list of items from the plurality of items; and
causing a device of the user to display a user interface with the list of items for inclusion into a cart.

14. A computer program product comprising a non-transitory computer readable storage medium having instructions encoded thereon that, when executed by a processor, cause the processor to perform steps comprising:
obtaining a plurality of attribute tuples stored in a database, each of the plurality of attribute tuples comprising an attribute type and an attribute value for a corresponding item of a plurality of items;
applying a clustering algorithm to the plurality of attribute tuples to group the plurality of attribute tuples into a first plurality of clusters, wherein applying the clustering algorithm comprises:
obtaining an embedding for each of the plurality of attribute tuples,
computing, using the embedding for each of the plurality of attribute tuples, a similarity score for each pair of the plurality of attribute tuples, and
applying a clustering model to group each pair of the plurality of attribute tuples having the similarity score above a threshold score to form the first plurality of clusters;
generating a plurality of prompts for input into a language model, wherein each prompt of the plurality of prompts is generated to include a respective subset of attribute tuples from the plurality of attribute tuples, and wherein attribute tuples from the respective subset of attribute tuples were grouped into a respective cluster of the first plurality of clusters;
requesting the language model to generate, based on each of the plurality of prompts input into the language model, one or more clusters of a second plurality of clusters, each cluster of the second plurality of clusters including one or more attribute tuples of the plurality of attribute tuples that have a common attribute type and a common attribute value;
generating, for each cluster of the second plurality of clusters, a respective normalized attribute tuple of a plurality of normalized attribute tuples, the respective normalized attribute tuple comprising a normalized attribute type and a normalized attribute value that are based on the common attribute type and the common attribute value;
mapping each of the one or more attribute tuples that belongs to each cluster of the second plurality of clusters to the respective normalized attribute tuple; and
rewriting each of the plurality of attribute tuples in the database to a corresponding normalized attribute tuple of the plurality of normalized attribute tuples to generate a respective rewritten attribute tuple of a plurality of rewritten attribute tuples.

15. The computer program product of claim 14, wherein the instructions further cause the processor to perform steps comprising:
grouping the respective subset of attribute tuples into the respective cluster of the first plurality of clusters, based on a similarity score for each pair of attribute tuples in the respective subset of attribute tuples being higher than a threshold score.

16. The computer program product of claim 14, wherein the instructions further cause the processor to perform steps comprising:
generating the plurality of prompts for input into the language model by further including, in each of the plurality of prompts, contextual information about each attribute tuple from the respective subset of attribute tuples, wherein the contextual information includes information about an item of the plurality of items with which each attribute tuple from the respective subset of attribute tuples is associated.

17. The computer program product of claim 14, wherein the instructions further cause the processor to perform steps comprising:
generating the respective normalized attribute tuple so that the normalized attribute type and the normalized attribute value are equal to one attribute type and one attribute value of the one or more attribute tuples grouped in each cluster of the second plurality of clusters.

18. The computer program product of claim 14, wherein the instructions further cause the processor to perform steps comprising:
requesting the language model to generate, based on attribute types and attribute values of the one or more attribute tuples grouped in each cluster of the second plurality of clusters, the respective normalized attribute tuple.

19. The computer program product of claim 14, wherein the instructions further cause the processor to perform steps comprising:
extracting at least one attribute tuple from a query, the at least one extracted attribute tuple including at least one extracted attribute type and at least one extracted attribute value for at least one item of the plurality of items;
matching the at least one extracted attribute tuple with at least one rewritten attribute tuple of the plurality of rewritten attribute tuples; and
ranking, based on the matching, the at least one item in a list of items from the plurality of items.

20. A computer system comprising:
a processor; and
a non-transitory computer-readable storage medium having instructions that, when executed by the processor, cause the computer system to perform steps comprising:
obtaining a plurality of attribute tuples stored in a database, each of the plurality of attribute tuples comprising an attribute type and an attribute value for a corresponding item of a plurality of items;
applying a clustering algorithm to the plurality of attribute tuples to group the plurality of attribute tuples into a first plurality of clusters,
wherein applying the clustering algorithm comprises:
obtaining an embedding for each of the plurality of attribute tuples,
computing, using the embedding for each of the plurality of attribute tuples, a similarity score for each pair of the plurality of attribute tuples, and
applying a clustering model to group each pair of the plurality of attribute tuples having the similarity score above a threshold score to form the first plurality of clusters;
generating a plurality of prompts for input into a language model, wherein each prompt of the plurality of prompts is generated to include a respective subset of attribute tuples from the plurality of attribute tuples, and wherein attribute tuples from the respective subset of attribute tuples were grouped into a respective cluster of the first plurality of clusters;
requesting the language model to generate, based on each of the plurality of prompts input into the language model, one or more clusters of a second plurality of clusters, each cluster of the second plurality of clusters including one or more attribute tuples of the plurality of attribute tuples that have a common attribute type and a common attribute value;
generating, for each cluster of the second plurality of clusters, a respective normalized attribute tuple of a plurality of normalized attribute tuples, the respective normalized attribute tuple comprising a normalized attribute type and a normalized attribute value that are based on the common attribute type and the common attribute value;
mapping each of the one or more attribute tuples that belongs to each cluster of the second plurality of clusters to the respective normalized attribute tuple; and
rewriting each of the plurality of attribute tuples in the database to a corresponding normalized attribute tuple of the plurality of normalized attribute tuples to generate a respective rewritten attribute tuple of a plurality of rewritten attribute tuples.

* * * * *